United States Patent
Thevenin et al.

[11] Patent Number: 5,937,027
[45] Date of Patent: Aug. 10, 1999

[54] METHOD AND DEVICE FOR THE TAKING OF DIGITAL IMAGES WITH CONTROL AND OPTIMIZATION OF THE EXPOSURE TIME OF THE OBJECT TO X OR γ RADIATION

[75] Inventors: Bernard Thevenin, St Egreve; Francis Glasser, Eybens; Jean-Luc Martin, St Geoire En Valdaine, all of France

[73] Assignee: Commissariat a l'Energie Atomique, Paris, France

[21] Appl. No.: 08/887,261

[22] Filed: Jul. 2, 1997

[30] Foreign Application Priority Data

Jul. 5, 1996 [FR] France .................................. 96 08422

[51] Int. Cl.[6] ...................................................... H05G 1/64
[52] U.S. Cl. .......................................... 378/98.8; 378/98.7
[58] Field of Search ................................... 378/98.8, 98.7, 378/96, 97, 108, 114, 207

[56] References Cited

U.S. PATENT DOCUMENTS

| | | |
|---|---|---|
| 5,448,613 | 9/1995 | Haendle et al. |
| 5,473,660 | 12/1995 | Bastiaens et al. ...................... 378/98.8 |
| 5,510,623 | 4/1996 | Sayag et al. |
| 5,574,764 | 11/1996 | Granfors et al. ................... 378/98.8 X |
| 5,574,765 | 11/1996 | Hassler et al. |
| 5,583,905 | 12/1996 | Nishiki et al. |

FOREIGN PATENT DOCUMENTS 0 441 521  8/1991  European Pat. Off.

*Primary Examiner*—David P. Porta
*Attorney, Agent, or Firm*—Oblon, Spivak, McClelland, Maier & Neustadt, P.C.

[57] ABSTRACT

A method and a device for taking digital images in which the exposure time of the object to X or γ rays is controlled and optimized in a way that produces, with each taking of an image, a non-saturated image and minimizes the dose of radiation necessary to produce this image. The device includes at least one image sensor having measurement pixels and pixels. The measurement pixels measure a current representative of a dose of radiation received by the object, and the image pixels are used to form the digital image. The dose of radiation measured by the measurement pixels is compared to a guide-line value, and when this dose measurement reaches the guide-line value the collection of the electrical charge by the image pixels is stopped. The stopping of the collection of the electrical charges is performed without stopping the radiation emission.

11 Claims, 7 Drawing Sheets

METHOD AND DEVICE FOR THE TAKING OF DIGITAL IMAGES WITH CONTROL AND OPTIMIZATION OF THE EXPOSURE TIME OF THE OBJECT TO X OR γ RADIATION

FIELD OF THE INVENTION

The invention relates to a method and a device for taking digital images that allows control and optimisation of the exposure time of the object to γ or X radiation so as to produce at each taking of an image, an image of good quality while minimising the dose of radiation to which the object is subjected.

This invention finds application in the field of X or γ radiography and, in particular, medical radiography and dental radiography, where it is necessary to limit the dose of radiation received by the patient and by the practitioner.

STATE OF THE TECHNOLOGY

In medical or dental radiography, the object to be radiographed is a part of the human body; this part differs according to the individual; according to age, morphology etc. The exposure time during which this part of the body (which one will call the "object" in the remainder of the description) must be exposed to the radiation in order to permit production of an image of suitable quality, is therefore variable.

According to standard medical radiological technique, the image of the part of the body to be observed is obtained by exposing a photographic film. In this technique, the exposure time during which the object must be subjected to the radiation is defined by positioning a timer on the pictogram of the object.

This exposure time can be chosen in a very approximate fashion since photographic films have a very broad exposure time latitude. Hence it is very easy to obtain an image of suitable quality, that is to say an image that is neither under-exposed, not over-exposed and which can therefore be read by the practitioner.

However, the image on film requires development following the taking of the image. It is therefore only after development of the photographic film that the practitioner knows if the image is of sufficient quality to be used or if he must begin again by taking another image.

Furthermore, the exposure of a photographic film requires a high dose of radiation. For the health of the patient and of the practitioner, it is necessary to minimise this dose of radiation.

A more recent technique consists of producing digital images which can be displayed on the screen of a computer. This technique allows one, not only to minimise the required dose of radiation but it also allows one to modify the image (contrast, colours, zoom etc.) in relation to the needs of the practitioner in such a way that the areas of the object that are of interest are made to stand out. Furthermore, the technique allows improvement of communication with the patient who can see the displayed image and understand more easily the origin of his or her pain.

FIG. 1 shows an example of a digital radiography device used generally to put this technique into practice. This device is being used, in the particular case of FIG. 1, for dental radiography.

One can see in this Figure, the head of a patient on whose tooth (the one with reference number 2) one wishes to carry out radiography and the device that allows this radiography to be carried out.

This device includes an X ray generator (reference number 3) which emits X rays in the direction of the tooth 2, behind which is placed an image sensor 4.

Generally, the image sensors used are CCD (coupled charge device) sensors provided for radiation in the "visible" range. The radiation emitted by the source, being X or γ radiation, these image sensors are linked to scintillators placed in front of the sensors in order to convert the X or γ radiation into light photons detectable by the CCD sensors. These scintillators are not shown in FIG. 1 for reasons of simplification.

The sensor 4 is connected, by a cable 5, to a system 6 for reading and processing the information supplied by this sensor. This reading system 6 includes, on the one hand, a video screen 6a on which is displayed the image of the tooth 2 and processing means 6b of the PC computer type which provide the formation of the image of the tooth on the screen 6a from the information supplied by the image sensor 4.

Various articles in the journal IMUDON describe digital radiography devices intended for the dental field, in particular the article "Sens-a-ray" by NELVIG et al., December 1992, the article "Direct digital radiography for the detection of periodontal bone lesions" by A. Joy FURKART et al. November 1992, and the article "Basic technical properties of a system for direct acquisition of digital intraoral radiographs" by U. WELANDER et al., April 1993.

However, CCD image sensors have a sensitivity, that is to say a radiation detection efficiency that is very variable from one sensor to another. Also the exposure time to which the object must be subjected depends very greatly on the sensor used.

In addition, these sensors pass very rapidly from linear operation to a state of saturation without an intermediate state. The optimum exposure time that allows one to obtain an optimum image is therefore very close to an exposure time giving a saturated image (grey levels, contrasts etc. ). Also, an image can pass from one of very good quality to an over exposure in a lapse of time during which the object receives a very small extra dose of radiation but one which is sufficient to saturate the sensor. When the produced image is saturated (under-exposed or over-exposed), the operator must take the image again and hence subject the patient to a new dose of radiation.

For a better understanding of this problem, different histograms representative of the definition (levels of greys, contrasts etc.) of different types of images are shown in FIGS. 2A to 2E.

To put it another way, these histograms show the distribution of the quantity of radiation (Nr) passing through the object to be radiographed in relation to the number of classes (cl). The encoded values that correspond to the different voltage levels of the pixels are called "classes". In particular, for a voltage of 2V, cl=100 and for a voltage of 5V, cl=900.

Therefore these histograms express the number of times each voltage level between 2V and 5V (expressed by the 800 classes) is assigned to a pixel. In practice, classes lower than 100 and greater than 900 are not taken into account on these histograms since they represent safety margins to take into account dispersion of the video signal from one sensor to another.

It will be understood then that the more the histogram is spread between classes 100 and 900, the more the image shown will be of good quality. In other words, in order to be of a suitable quality, that is to say neither under-exposed, nor over-exposed, an image must make use of a large part of the dynamic range of the sensor. An optimum image is therefore represented over the whole dynamic range of the sensor, or over 800 classes, for the examples produced in FIGS. 2A–2E.

FIG. 2A shows the histogram of the levels of definition of an under-exposed image or an image opaque to the X-ray radiation. It can be seen in this Figure that the histogram is grouped together around the class 900; the image obtained will therefore have very uniform levels of grey and will be illegible for the practitioner.

FIG. 2B shows the histogram of the levels of definition of an under-exposed image having, all the same, a certain useful dynamic range $D_u$, of a value of about 300 classes. The image corresponding to this histogram is of good quality but could be improved still more.

In FIG. 2C, the histogram is shown of levels of definition of an "interesting" image, that is to say an image of quality. This histogram shows that the useful dynamic range $D_u$ of the corresponding image is about 550, which is sufficient for the image obtained to be of very good quality.

However, the quality of this image can be even further improved.

In FIG. 2D, the histogram is shown of levels of definition of an "optimum" image, that is to say an image whose quality is optimal. The dynamic range $D_u$ of this image is, as can be seen in this Figure, between about 100 and 900 classes, or $D_u \approx 800$. This image therefore exploits the entire useful dynamic range of the sensor and the signal to noise ratio is the optimum.

FIG. 2E shows the histogram of an over-exposed image, that is to say an image having a very small useful dynamic range, close to class 100.

STATEMENT OF THE INVENTION

The precise aim of the invention is to remedy the disadvantages of the techniques previously explained. To this end, a method and a device are proposed for the taking of digital images in which the exposure time of the object to the X or γ radiation is controlled and optimised in a way that produces, on each taking of an image, a non-saturated image and that minimises the radiation dose required to create this image.

One of the objectives of the invention is therefore to allow the production, on each taking of an image, of an image of correct quality, that is usable by the practitioner, with a minimum dose of radiation.

Another objective of the invention is to allow the creation of an image of optimum quality that makes best use of the dynamic range of the sensor without the risk of saturating the sensor.

In a more precise fashion, the invention relates to a method for taking digital images of an object placed in front of at least one image sensor and subjected to X or γ radiation during a certain exposure time. The image sensor used in this method includes a layer of detection material capable of converting the X or γ radiation into electrical charges and a plurality of pixels capable of collecting these electrical charges and of supplying, from measurements, information on the transparency of the object to the radiation. This method comprises the steps consisting of:

a) choosing, from among the plurality of pixels, measurement pixels, used to measure the dose of radiation received by the object and controlling the exposure time, the other sensor pixels being image pixels being used to form the digital image; and at each instant:

b) summing the measurements supplied by the measurement pixels, this sum corresponding to the dose of an image pixel situated in the middle of the histogram and called a mean dose;

c) comparing this dose measurement to a predefined guide-line value; and d) when this mean dose measurement reaches the guide-line value, commanding the stopping of the measurements on each image pixel; then e) forming an image of the object by reading the image pixels at the end of the exposure time.

It should be noted that the measurement pixels supply information as current about the transparency to X rays of the object at the vertical to the pixels.

The radiation received by a measurement pixel creates electrons which are collected in a measurement capacitance linked to each pixel; the quality of charge is representative of the dose of radiation received by the measured pixel.

According to a first embodiment stopping the collection of the electrical charges in step d) consists of stopping the emission of radiation.

According to a second embodiment stopping the collection of the electrical charges in step d) consists of diverting the electrical charges coming from the layer of detection material towards an absorption substrate so that only the charges collected during the exposure time are stored by the pixels.

Furthermore, this method can consist of producing a first image of the object from steps a) to e) by choosing a low first guide-line value and then producing a second image of the object from steps a) to e) with a second optimum guide-line value determined as a function of the first guide-line value.

The method of the invention can also include a step f) of regenerating the digital image formed in step e), by correcting, on this digital image of the object, the missing pixels corresponding to the measurement pixels.

The invention also relates to a device for putting this method into practice which comprises:

a source of X or γ radiation directed towards the object;

at least one image sensor placed behind the object, with respect to the radiation source, and including a layer of detection material capable of converting the radiation received into electrical charges and a plurality of pixels capable of collecting the electrical charges and of supplying information about the transparency of the object to the radiation; and a reading system for reading and processing the information supplied by the pixels.

This device is characterized by the fact that the plurality of pixels comprises image pixels used to form the digital image of the object and measurement pixels used to measure the dose of radiation received by the object during an exposure time; and that the reading system comprises means of determining a measurement of a mean dose of radiation received by the measurement pixels, means of comparing this dose measurement to a guide-line value, means of detecting the end of the exposure time of the object to the radiation and means of reading the information supplied by the image pixels at the end of the exposure time.

Advantageously, the means of determining a measurement of mean dose of radiation comprise:

a current summation circuit supplying a mean current coming from the measurement pixels;

a circuit for converting the current into voltage to carry out a current/voltage conversion, as a function of time, the voltage being representative of the dose received by an average pixel;

a dose calculating circuit to determine, from this mean value measurement, a measurement of the mean dose of radiation received by the image pixels.

In effect, the currents coming from the group of measurement pixels are summed, then directed to an integrator circuit or conversion circuit situated, advantageously outside the sensor.

This integrator circuit carries out a conversion of this current into voltage. This voltage is representative of the dose received by an average pixel.

Advantageously, this voltage is digitised at each instant and compared to a digitised stop guide-line value.

According to the invention, each image pixel is connected to a condenser providing storage of the charges received by the pixel.

According to the invention, the detection material is a semiconductor; advantageously, it can be CdTe (cadmium telluride).

According to one embodiment of the invention, the reading system comprises, in addition, means of calculating an optimum exposure time.

In an advantageous way, the image pixels are distributed in several areas separated one from another by at least one row of measurement pixels.

According to one embodiment of the invention, the device includes several image sensors each connected to means of determining the dose measurement, themselves connected to a time division multiplexer capable of processing in parallel, the information supplied by each of the means of determining the dose measurement.

DETAILED DESCRIPTION OF EMBODIMENTS OF THE INVENTION

As previously explained, the invention allows one to produce a digital image of suitable quality of an object and, more particularly, of a part of the body of an individual, with a minimum dose of x radiation; in all subsequent description when the term X radiation is used, it will be understood that it could equally well refer to γ radiation.

Also, in order to obtain an "optimum" image, the invention proposes to improve the encoding resolution of the image, that is to say, the number of classes that expresses the dynamic range of the chosen absorption and to improve the signal to noise ratio of the image. In effect the greater the signal to noise ratio, the better the quality of the image will be.

Figure 1:
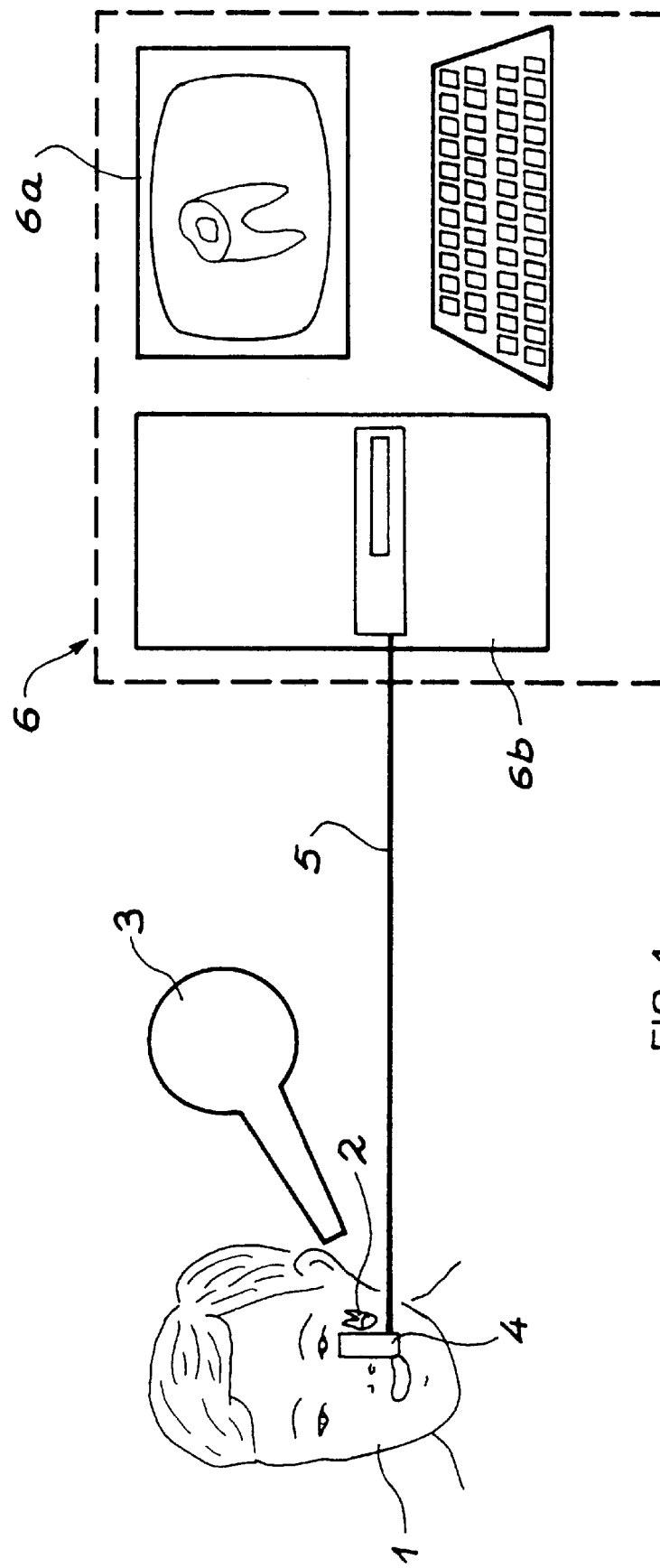
FIG. 1 shows diagrammatically the device of the invention being used for dental radiography
Figure 2A:
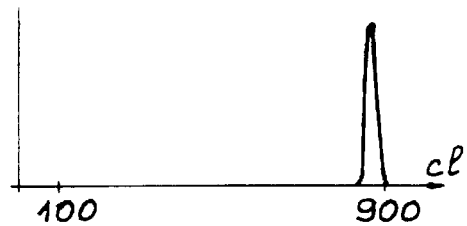
FIGS. 2A to 2E show the histograms of levels of grey of different sorts of images: under-exposed images, correct image, optimum image, over-exposed image.
Figure 2B:
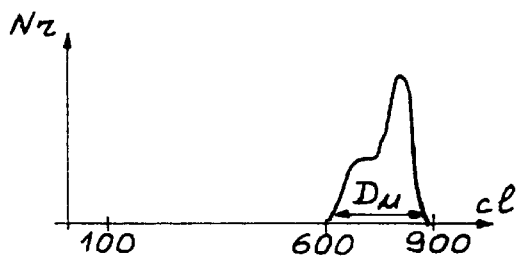
Figure 2C:
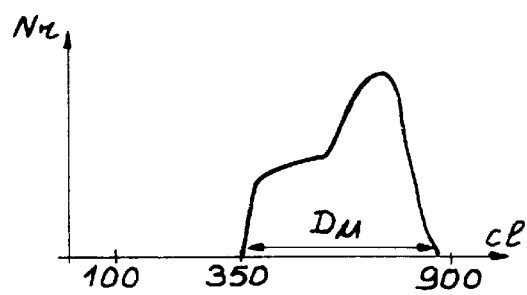
Figure 2D:
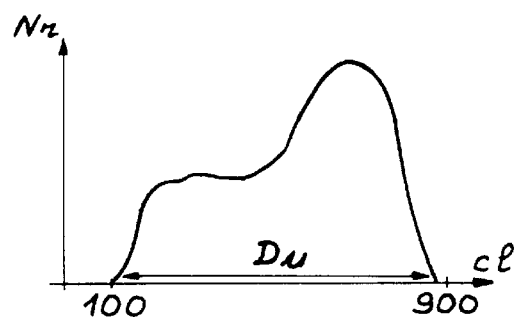
Figure 2E:
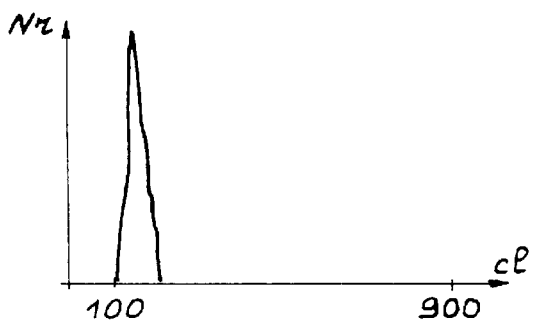

For that, the invention proposes a device that includes elements identical to those shown in FIG. 1, namely:

a source of radiation that emits radiation in the direction of the object; this source can be a generator of X radiation (or of γ radiation according to the embodiment);

at least one image sensor, placed behind the object with respect to the source of radiation; this sensor provides the conversion of radiation received from the X ray generator into information relating to the transparency of the object to the radiation; and a reading system that allows the information to be read and processed.

The image sensor and the reading system are particular to the invention; therefore they will be described in a more precise way making reference to the appended drawings.

Figure 3:
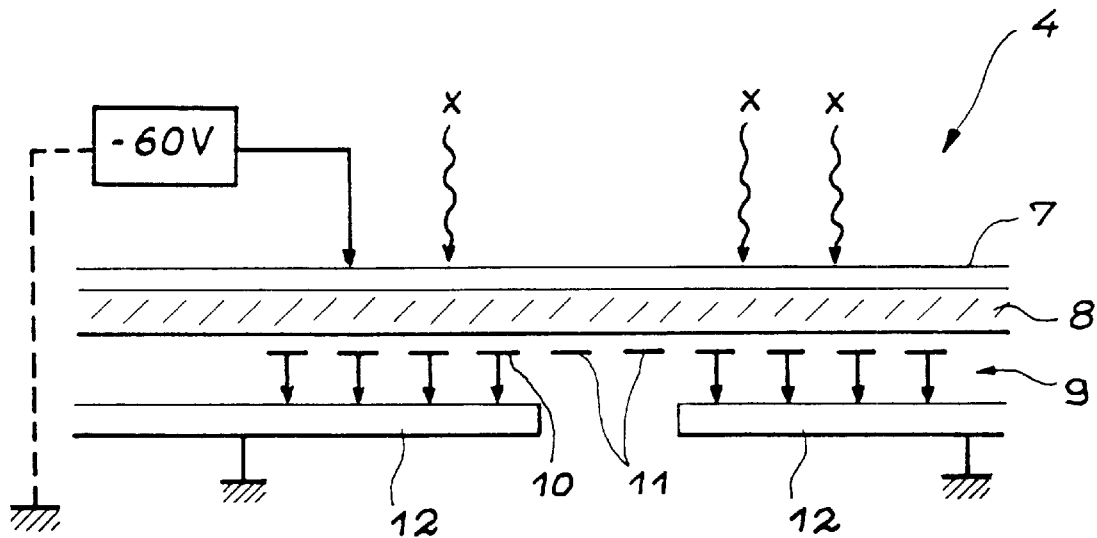
FIG. 3A shows diagrammatically a portion of an image sensor conforming to the invention
FIG. 3B shows the distribution of the image pixels and the measurement pixels in a sensor from FIG. 3A.
Figure 3:
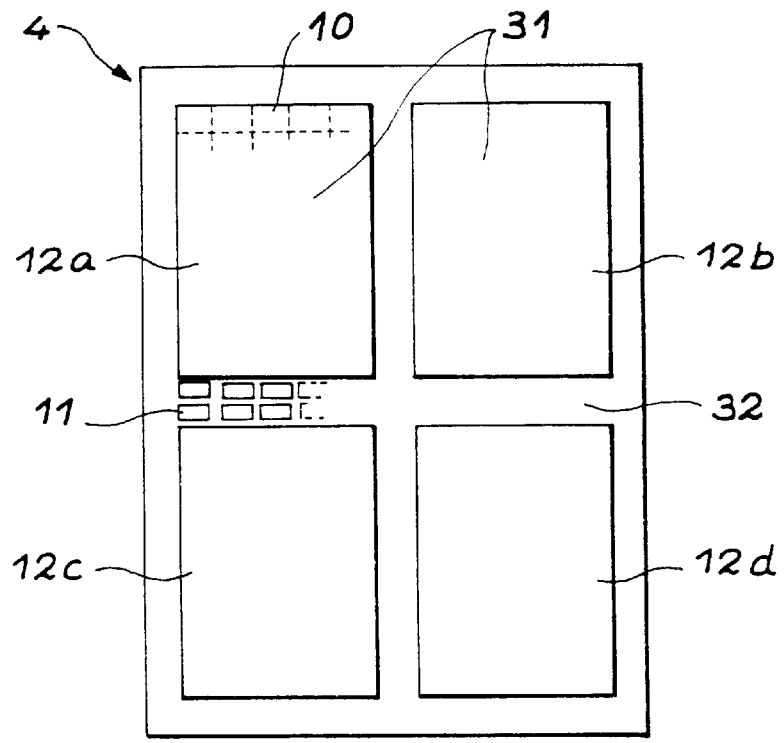

In FIG. 3A, an image sensor is shown diagrammatically that conforms to the invention. This image sensor, reference number 4, is a CdTe type sensor. It comprises a first electrode 7 transparent to the X radiation and which has the role of establishing an electric field in the layer of detection material 8 made of CdTe (cadmium telluride). The purpose of this layer of CdTe 8, also called "the barrier layer", is to convert the photons of X radiation into electrical charges proportional, in each place, to the transparency of the object to the X radiation.

Furthermore, this barrier layer 8 is subjected to an electrical field which ensures the migration of the electrical charges created towards a collector electrode 9. This collector electrode 9 is broken up into many elements of small surface area (about $50\times50 \,\mu m^2$) that form pixels. Each pixel therefore gathers the electrical charges created in the part of the layer of CdTe 8 situated on its vertical. The charges thereby collected on each pixel are stored in a condenser connected to each of the pixels, but not shown on this FIG. 3A for reasons of simplification.

As will be seen more clearly in the following, the pixels forming the collector electrode 9 are of two types: image pixels, reference number 10, and measurement pixels, also called "dose pixels", reference number 11. These two kinds of pixels, are arranged according to zones: image zones z1 and measurement zones z2. Under each image zone z1 a reading circuit is positioned 12a, 12b, 12c or 12d. These reading circuits 12a, . . . , 12d allow information supplied by the image pixels to be read and, in association with the processing means for this information permit the formation of the digital image representative of this information.

As mentioned previously, the measurement pixel zones and the image pixel zones can have different forms. The preferred embodiment of these pixel zones is shown in FIG. 3B.

According to this embodiment, the image pixels 10 are arranged in four identical zones z1 separated from one another by a measurement zone z2. According to this embodiment, this measurement zone is made up of two rows of measurement pixels 11.

The sensor 4 of the invention therefore comprises four reading circuits 12a to 12d, that is to say a reading circuit placed under each image zone z1.

FIG. 3B shows the image sensor of FIG. 3A according to a view from below. One can then see that the four reading circuits 12a, 12b, 12c and 12d each cover an image zone z1 where the image pixels 10 are shown in dotted line on the Figure. Between these reading circuits 12a, . . . , 12d that is to say between the image zones z1, the two rows of measurement pixels 11 are arranged which form more or less a cross between the four reading circuits.

For information only, it can be stated that for a sensor of dimensions approximating 20×30 mm, the measurement zone z2 comprises two lines each with about 400 pixels. These measurement pixels, which have no reading circuit facing them, supply information used to determine the dose of X radiation received by the whole of the sensor.

In effect, these measurement pixels are considered as representatives of the image pixels; it is therefore considered that the measurements made on these measurement pixels when taken as a whole, correspond to the measurements that could be made on the image pixels. Statistics carried out on these two kinds of pixels show that the histogram of the measurement pixels of this sensor bear a very strong resemblance to the histogram produced with the image pixels. The measurement pixels are therefore representative of the whole of the information held by the pixels of this sensor.

For this, the charges received by the measurement pixels are taken out from the sensor in such a way that they can be transferred onto neighbouring image pixels and, as a consequence, they do not distort the image obtained by means of the image pixels.

Figure 4A:
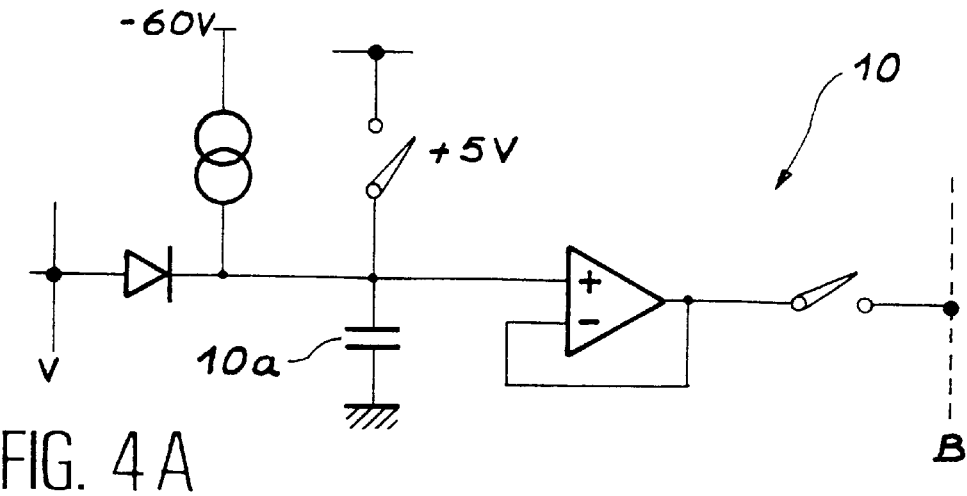
FIG. 4A shows diagrammatically a circuit creating an image pixel and FIG. 4B shows a circuit creating a measurement pixel.

In FIG. 4A an image pixel is shown such as is known by a man skilled in the art; this Figure will only therefore be described very succinctly. As shown in FIG. 4A, each image pixel 10 is connected to a condenser 10a, supplied with a voltage of up to +5V by an initial charging system. This condenser 10a is intended to store the charges received by the pixel; these accumulated charges constitute the information that will be read, via the bus B, by the reading circuit situated opposite the pixel in order to produce the digital image.

Figure 4B:
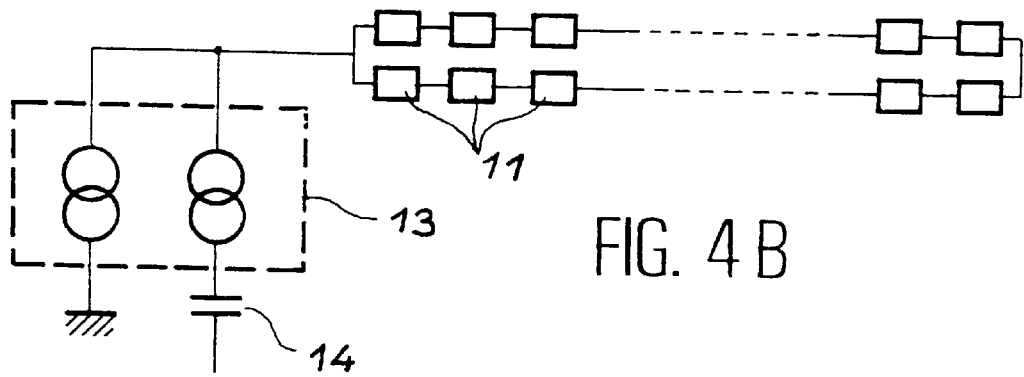

FIG. 4B, represents diagrammatically a chain of measurement pixels of sensor 4.

According to the invention, these measurement pixels are connected to one another and form an assembly. The current coming from this assembly is then the sum of the currents of each measurement pixel.

It should be noted that the measurement pixels are of the same kind as the image pixels from the point of view of detection material, but that their currents are not directed to a dedicated integration circuit (in contrast to the image pixels) since they are summed, then directed to a current amplifier, and then fed to a processing device.

Hence the current coming from the measurement pixel assembly output, that is to say the current resulting from the sum of the currents of each measurement pixel, is then multiplied by a current multiplier 21 (for example by a factor of 10) in a way that permits more easy processing of the information obtained.

The method of the invention consists of determining, from information supplied by these measurement pixels, a mean radiation dose, representative of the dose of radiation received by an average image pixel, that is to say a pixel having a integration level of average charge. It is the integration level of this average pixel that will be used subsequently to determine if the exposure time of the object to the X radiation is sufficient or not. This will be explained in more detail below.

For this, the current obtained at the output of the multiplier 21 is directed to a measurement condenser 14 situated outside the sensor. By assigning to this condenser a value of 800×10×CM where CM is the measurement capacity of the pixels, one obtains a voltage change in the condenser comparable to that which occurs in the average pixel.

Figure 5:
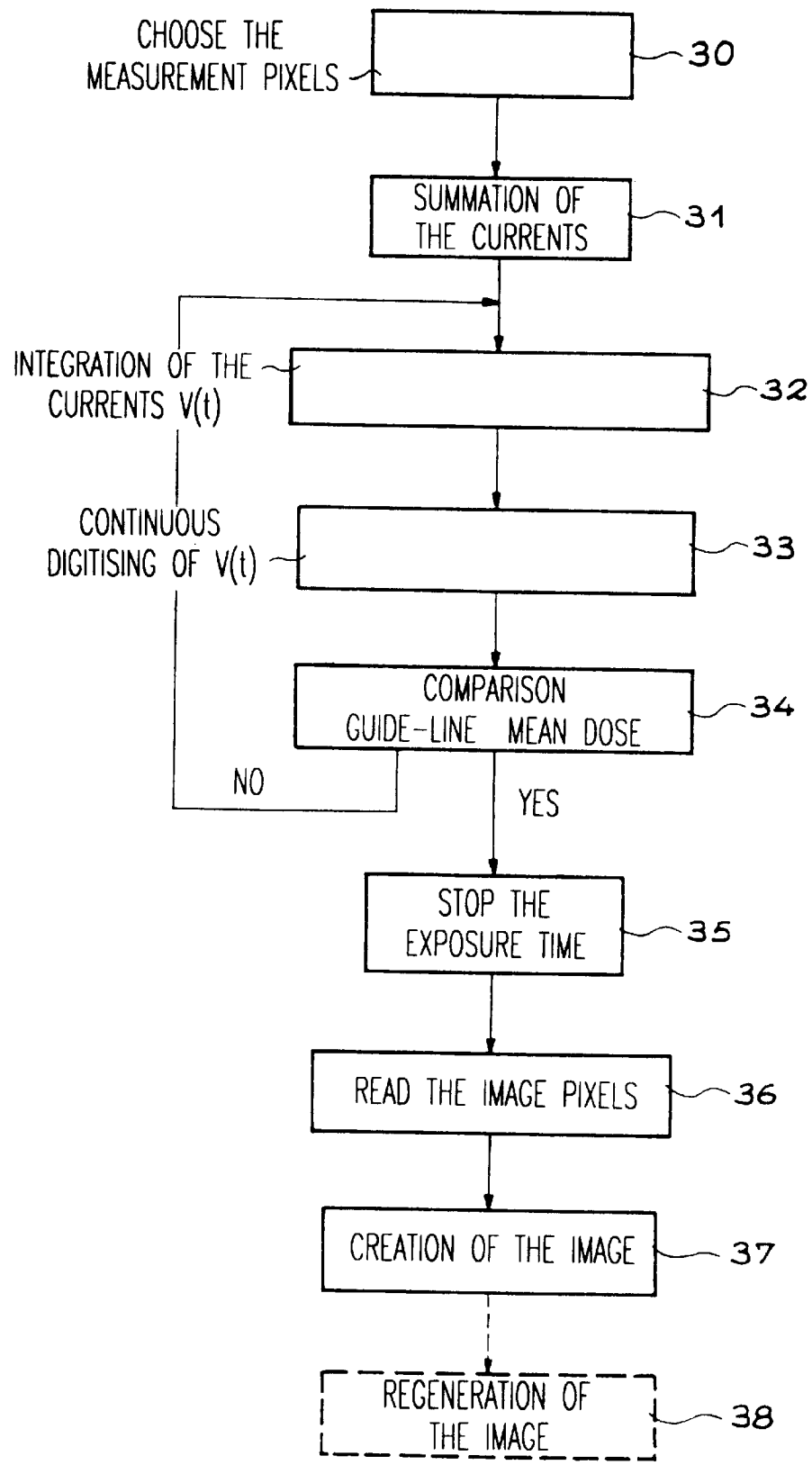
FIG. 5 shows the functional diagram of the method of the invention.

A functional diagram of the method of the invention has been shown in FIG. 5. This method consists, first of all, of choosing (step 30) from the whole of the sensor pixels, measurement pixels intended to determine the mean radiation dose of an average pixel.

This method then consists of, at each instant, carrying out the summation of the currents from the measurement pixels (step 31) in order to obtain a mean current. This mean current is integrated and supplies information of the variation of voltage as a function of time which gives information about the mean transparency of the object to the X radiation. The information V(t) changes in the same way as the charge of an "average" image pixel.

Step 33 consists of digitising in continuous fashion this voltage V(t) which represents the mean dose of radiation received by the image pixels, that is to say, the dose of radiation received by a pixel having a mean level of definition.

Step 34 then consists of comparing this measurement of mean dose with a guide-line value supplied by the command processor. When the mean dose reaches or exceeds the guide-line value, this signifies that the integration level of mean charge of the pixels is sufficient for the image obtained not to be under-exposed, and not too high for the image obtained to be over-exposed.

The process is continuous and is stopped when the mean dose reaches the guide-line value: the new charges received by the measurement pixels are added to the sum of the charges previously calculated.

If the guide-line value is reached, the end of the exposure time is decided (step 35), which amounts to saying that the collection of charges by the pixels is stopped. This stopping of the collection can occur in two different ways, described later.

Put another way, the integrator supplies a voltage V(t) and the analog to digital converter continuously keeps the analog value V(t) discrete. This digital value is compared to the guide-line value. Digitising V(t) allows a monitoring processor to control the progress of the integration on the sensor (and hence the dose) and to act in the place of the controller to stop the integration on the sensor and, possibly, to stop the X ray generator.

From the end of the charge collection, sequential and ordered reading of the image pixels is carried out (step 36), that is to say, the information supplied by each image pixel is logged in order to produce the digital image being sought (step 37).

According to one embodiment of the invention, the method includes an extra step 38 consisting of regenerating the image obtained correcting the faults due to the fact that the values from the measurement pixels are not taken into account in forming the image.

Figure 6:
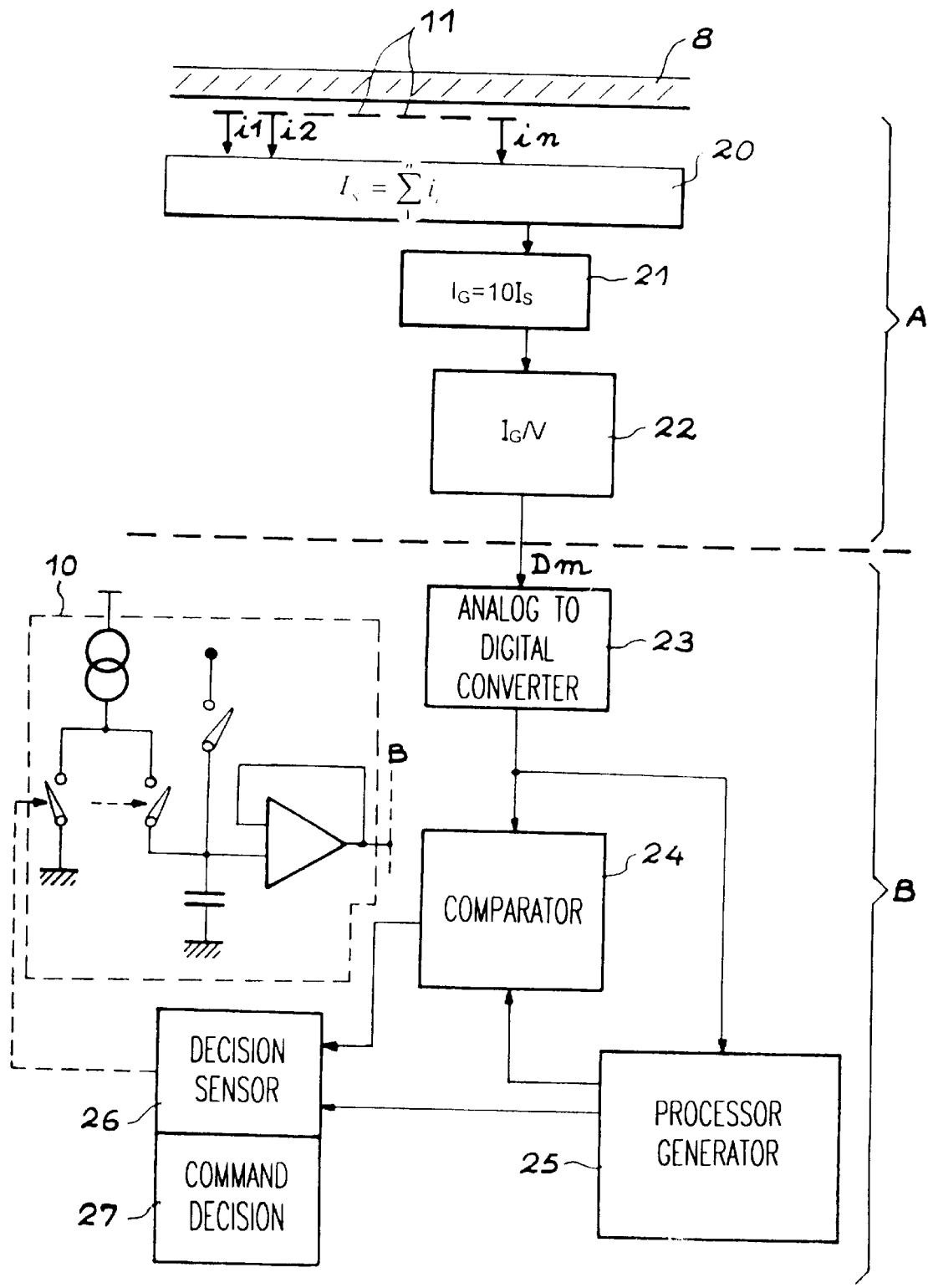
FIG. 6 shows the flow diagram of the chain of processes carried out by the device of the invention.

In FIG. 6, a flow diagram is shown of the different operations of the method of the invention. These operations can be divided up into two parts part A which represents the measurement phase part B which represents the processing phase The measurement phase comprises the operations that allow integration of the radiation dose emitted by the X ray generator and received by the sensor, in a form of variation of the voltage as a function of time V(t).

The processing phase comprises the operations that allow processing of the measured data in order to decide the end of the exposure time (digitising in real time and comparison with the stop guide-line).

To put it more clearly, the measurement phase A of the method of the invention consists, as has already been previously explained, of summing all the currents $i_i$ flowing in the measurement pixels 11. The device that allows this summation operation $$I_S = \sum_{1}^{n} i_i$$

to be carried out has reference number 20.

The sum $I_s$ of these currents is then amplified, for example with a gain 10, by an amplifier 21; the amplified current thus obtained is named $I_G$. This current $I_G$ is then passed into an integrator 22 which converts it into a voltage whose change in voltage per unit of time is similar to that occurring in the charge integrator of an average image pixel.

In addition, this integrator 22 carries out an averaging in a way that determines the mean radiation dose $D_m$ for an average pixel. One may consider, in fact, that the dose integrator simulates the average pixel.

The information relating to the mean dose $D_m$ is then digitised by an analog to digital converter 23 which samples this information (for example at 2×106 samples/second) which then provides information on what is taking place, in real time at the sensor. In effect, all this processing is carried out at each instant of the measurement in a way that informs the command processor of what is taking place, at each instant at the measurement pixels of the sensor, it not being possible to see the development of the image pixels in real time since the data supplied by the image pixels will only be used at the end of the method in order to form the digital image. The measurement pixels therefore provide information on the state of the image pixels, which themselves will be read after the measurement phase.

The digitising of $D_m$ by the analog to digital converter 23 is therefore the first step in processing the measured signal in the measurement part A. The digitised signal thus obtained ($S_n$) is then, on the one hand, analysed by a comparator 24 and, on the other hand, held available to the command processor 25 which may have other guide-line values and may be used to combine them. In particular, the signal $S_n$ is compared with a guideline value, supplied by the processor 25 and representative of the mean desired levels of definition on the image. It is determined, by the processor, from data entered by the practitioner and the signals $S_n$ providing information on the state of the pixels at each instant; it can be modified during the course of the method.

There is, of course, a margin of uncertainty which can be digitised when there is a change of object at each measurement, as is the case in dental imagery, since it is necessary to adapt to each patient; the guide-line value is, in effect, chosen in a way that integrates the concern not to saturate the image; it can equally well be chosen in such a way that the range of uncertainty is integrally incorporated within the useful dynamic range of the image. In this case, the image runs the risk of not exploiting the dynamic range of the sensor in its entirety, but of only making use of between 60 and 100%, which even so allows an image to be obtained of a quality that is entirely acceptable, as was explained in relation to FIGS. 2A to 2E.

The processor, being capable of knowing, in real time, the state of the measurement pixels (signal $S_n$), it can decide, itself, to stop the integration of the charges and this, even before the means of comparison have done it.

As a function of the result of the comparison 24 of the signal $S_n$ with the guide-line value, the exposure of the object to the X radiation continues or is ended. In effect, as long as the measured digitised value of the mean dose is less than the guide-line value, the processing continues, that is to say, the pixels of the sensor continue to store the electrical charges. On the contrary, as soon as this value reaches or exceeds the guide-line value, the integration of the charges by the pixels is stopped.

This decision to stop the integration of the charges is represented, on FIG. 6, by block 26 and can be physically carried out in two different ways:

either the integration of the charges is stopped by stopping the emission of radiation by the X ray generator, if it can be stopped outside of programming (block 27);

or the X ray generator continues to emit radiation and the electrical charges produced by the barrier layer are drained off in such a way that creates no disturbance to the neighbouring image pixels; the electrical charges stored in each pixel at the instant of the decision to stop integration are isolated from any new input in order to safeguard the measurement; advantageously these supplementary charges are diverted to a substrate which is capable of absorbing them until the X ray generator is switched off (at the time programmed for it); preferably this substrate is the one that includes the reading circuit.

When the decision to stop the integration of the charges has been taken, the reading circuits take the information supplied by the image pixels 10, via the bus B so as to produce the digital image of the object, in accordance with the usual method.

The method of the invention, as it has been described until now, allows the production of an image of good quality, on each taking of an image. However, the method also allows the production of an image whose quality is optimal.

In this case, the method consists of choosing an intentionally low first guide-line value, that is to say a guide-line value corresponding to a X radiation dose that is not very high, then of carrying out steps 31 to 36 of the method with this first guide-line value; the image obtained for such a guide-line value would only have a relatively small useful dynamic range; but this image is not intended to be used directly by the practitioner; it is used as a base for determining, through a simple rule of three, the optimum useful dynamic range and hence the optimum exposure time that will allow an image of optimum quality to be obtained. One then determines the supplementary dose of radiation to which the sensor must be subjected in order for the definitive image obtained on the screen to be an optimum image.

Figure 7:
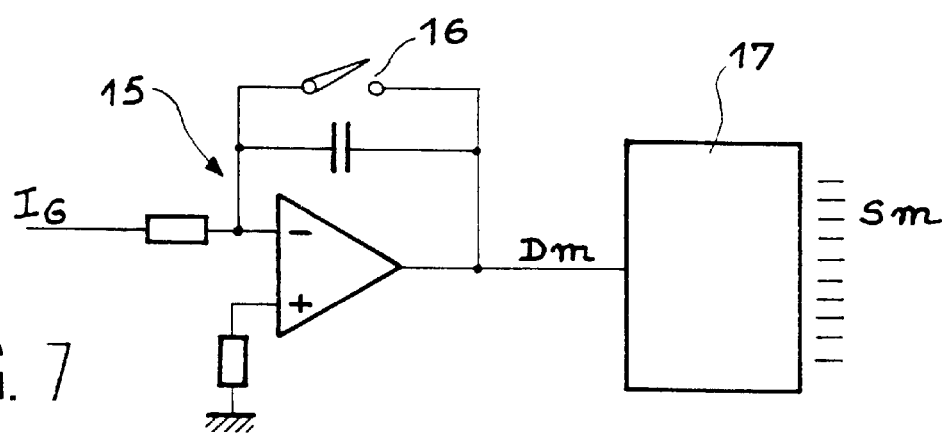
FIG. 7 shows the circuit for integrating and digitising the information supplied by the measurement pixels.

On FIG. 7, the conversion circuits (or integrator) and analog to digital converter 22 and 23 of FIG. 6 have been shown diagrammatically. More precisely, this diagram shows the conversion circuit 15 which provides the current/voltage conversion of $I_G$ and the determination of the mean dose of radiation on which is mounted, in parallel, a switch 16 that allows the function V(t) to be reset to zero, outside of a measurement phase. The output of this conversion circuit 15 is connected to an analog to digital conversion circuit 17 which provides the sampling of the mean dose signal $D_m$. This digitising circuit 17 can be, for example, an analog/digital encoder, encoding the signals onto 10 bits.

Figure 8:
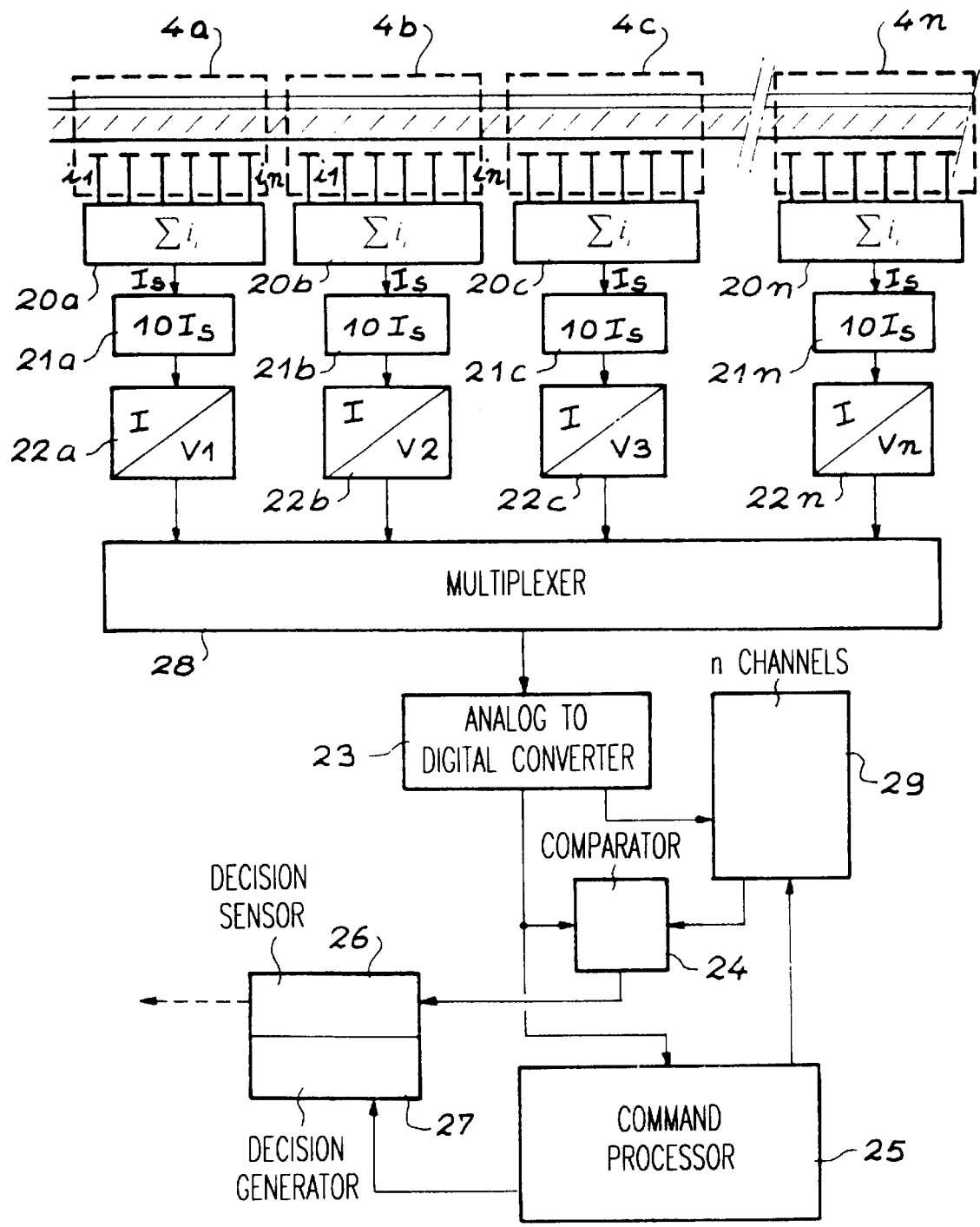
FIG. 8 shows a functional diagram of the invention when the device includes several image sensors.

In FIG. 8, a flow diagram has been shown for the method of the invention created for a device that includes several sensors.

In effect, according to one embodiment of the invention, the device can include n sensors, with reference numbers 4a, 4b, 4c, . . . 4n. The information obtained at the output of each of the pixels of each sensor is then summated by a summation device 20a, 20b, 20c, ... 20n, then amplified by a gain 10 by a multiplier 21a, ..., 21n and then converted into voltage by an integrator 22a, ..., 22n. The voltage values obtained at the output of the integrators 22a, ..., 22n are then introduced into a multiplexer 28 which carries out time division multiplexing.

The measurement obtained at the output of this multiplexer 28 is introduced, as previously described, into digitising means 23, except that in this case, the sampling is carried out on the n channels of the multiplexer (represented by block 29), which gives n digitised mean dose measurement values; each digitised value is then compared to the guide-line value supplied by the processor.

The rest of the processing being identical to that explained in relation to FIG. 6, it will not be described more precisely here.

Whatever the embodiment of the invention, the digital image obtained at the output of the device can, subsequently, be corrected from faults due to the fact that the information received by the measurement pixels has not been used to create the image. In particular, if the arrangement of the measurement pixels shown in Figure 3B is considered, two rows of pixels will be missing on the image obtained. This fault can be corrected, by the command processor after acquisition of the image by a method known to men skilled in the art; in particular, it can be corrected by a very simple method which consists of copying the neighbouring pixel in the place of the missing pixel or of fabricating the missing pixels by a process of interpolation.

It should however be made clear that the image produced has been made for a certain number of levels (cl=800 levels in the example given) since the image that will be displayed on the screen will only contain 250 levels. In any case, this number of levels of the image obtained at the output of the device will have to be reduced before being displayed on the screen.

We claim:

1. A method for taking digital images of an object placed in front of at least one image sensor and subjected to an X or γ radiation emission during a certain exposure time, the image sensor including a layer detection material capable of converting the radiation into electrical charges and a plurality of measurement pixels and image pixels capable of collecting these electrical charges and of supplying, from measurements, information on the transparency of the object to the radiation, comprising;
   a) measuring a current representative of a dose of radiation received by the object using, the measurement pixels,
   b) summing the current measurements supplied by the measurement pixels, this sum corresponding to a mean dose of an image pixel;
   c) comparing said mean dose to a predefined guide-line value;
   d) when said mean dose reaches the guide-line value, stopping the collection of the electrical charges by the image pixels without stopping the radiation emission; and
   e) forming an image of the object by reading the image pixels at the end of the exposure time.

2. A method according to claim 1, wherein the stopping of the collection of the electrical charges in step d) comprises diverting the electrical charges coming from the layer of detection material towards an absorption substrate so that only the charges collected during the exposure time are stored by the pixels.

3. A method according to claim 1, wherein:
   steps a) to e) are performed a first time using a low first guide-line value, and
   steps a) to e) are performed a second time using a second optimum guide-line value determined as a function of the first guide-line value.

4. A method according to claim 1, further comprising;
   f) regenerating the digital image formed in step e), by correcting, on this digital image of the object, for missing pixels corresponding to the measurement pixels.

5. A device for taking digital images of an object comprising:
   a source capable of generating an emission of X or γ radiation directed towards the object;
   at least one image sensor placed behind the object, with respect to the radiation source, and including a layer of detection material capable of converting the radiation received into electrical charges and a plurality of image pixels and measurement pixels capable of collecting the electrical charges and of supplying information on the transparency of the object to the radiation, wherein the image pixels are used to form the digital image of the object, and the measurement pixels are used to measure a mean dose of radiation received by the object during an exposure time;
   a reading system for reading and processing the information supplied by the image pixels and measurement pixels, wherein the reading system comprises;
   mean dose mechanism configured to determine the mean dose of radiation received by the measurement pixels,
   a comparing mechanism configured to compare the mean dose with a guide-line value,
   a detecting mechanism configured to detect the end of the exposure time of the object to the radiation, and
   a reading mechanism configured to read the information supplied by the image pixels at the end of the exposure time; and
   a stopping mechanism configured to stop the collection of electrical charges by the image pixels, when the reading system indicates that the mean dose of radiation has reached the guide-line; and
   an isolating mechanism configured to isolate the electrical charges collected by the image pixels after their collection is stopped by the stopping mechanism.

6. A device according to claim 5, wherein the mean dose mechanism comprises:
   a current summation circuit supplying a mean current coming from the measurement pixels;
   a conversion circuit for carrying out a current/voltage conversion, as a function of time, the voltage being representative of the dose received by an average pixel; and
   a dose calculating circuit to determine, from this value of mean measurement, a measurement of the mean dose of radiation received by the image pixels.

7. A device according to claim 5, wherein each image pixel is connected to a condenser providing the storage of the charges received by the pixel.

8. A device according to claim 5, wherein the detection material is CdTe (cadmium telluride).

9. A device according to claim 5, further comprising processing means for determining the optimum exposure time, said processing means being connected to the reading mechanism.

10. A device according to claim 5, wherein the image pixels are divided up into several areas separated from one another by at least one row of measurement pixels.

11. A device according to claim 5, further comprising several image sensors each connected to the mean dose mechanism, said mean dose mechanism being connected to a time division multiplexer capable of processing in parallel the information supplied by the mean dose mechanism.

* * * * *